United States Patent [19]

Fröschl et al.

[11] Patent Number: 4,654,731
[45] Date of Patent: Mar. 31, 1987

[54] VCR CASSETTE TRANSPORT MECHANISM WITH MECHANICAL OVERLOAD PROTECTION

[75] Inventors: Kurt Fröschl; Lothar Jager, both of Vienna, Austria

[73] Assignee: U.S. Philips Corporation, New York, N.Y.

[21] Appl. No.: 773,719

[22] Filed: Sep. 9, 1985

[30] Foreign Application Priority Data

Nov. 15, 1984 [AT] Austria ............................ 3619/84

[51] Int. Cl.$^4$ ............................................ G11B 5/008
[52] U.S. Cl. .................................. 360/96.5; 360/137; 242/198
[58] Field of Search ................ 360/96.5, 137; 242/198

[56] References Cited

U.S. PATENT DOCUMENTS

| | | | |
|---|---|---|---|
| 4,447,838 | 5/1984 | Kato | 360/96.5 |
| 4,466,030 | 8/1984 | Kato | 360/96.5 |
| 4,484,240 | 11/1984 | Yoshida | 360/96.5 |

FOREIGN PATENT DOCUMENTS 0141074 9/1982 Japan .................................. 360/96.5

Primary Examiner—A. Michael Chambers
Attorney, Agent, or Firm—David R. Treacy

[57] ABSTRACT

A recording and/or reproducing apparatus comprising a cassette receptacle (5), into which a cassette (3) can be inserted manually in a direction of insertion (4) and which comprises at least one member (15) for retaining a cassette, which member is at least partly movable in the direction of insertion from an initial position to an operating position and can be coupled to a cassette in its initial position. Said member is coupled to a drive lever (22) via a pin-slot linkage (21) in order to be driven by a motor (27) via a drive mechanism (26), the pin (40) cooperating with a longitudinal wall (42) of the slot (39) when the drive lever (22) is driven by the motor. In its other longitudinal wall (43) the slot (39) has a recess (44) which extends substantially in the direction of insertion. When the member (15) is in its initial position the recess (44) and the pin (40) are situated opposite one another and when a cassette (3) is coupled to the member (15) the pin (40) engages the recess (44) and is clamped against a wall portion (45) to block a pivotal movement of the drive lever (22). (FIG. 1).

5 Claims, 4 Drawing Figures

VCR CASSETTE TRANSPORT MECHANISM WITH MECHANICAL OVERLOAD PROTECTION

BACKGROUND OF THE INVENTION

The invention relates to a recording and/or reproducing apparatus for a record carrier accommodated in a cassette, comprising a cassette receptacle into which the cassette can be inserted manually in a direction of insertion. The receptacle includes at least one cassette-retaining member, which is movable from an initial position into an operating position at least partly in the direction of insertion. When the member is substantially in its initial position, it can be coupled to a cassette which is inserted manually up to an insertion position defined by a coupling stop on the member. The cassette-retaining member is coupled to a pivotable drive lever through a pin-slot linkage to move the member with the cassette, in response to pivoting of the drive lever by a motor. One of the two longitudinal walls of the slot of the pin-slot linkage cooperates with the pin when the drive lever is driven by the motor, to move the member from its initial position to its operating position.

Such an apparatus is known, for example from German Offenlegungsschrift No. 32 38 510 to which British published patent application No. 2 112 559 corresponds. When in the known apparatus the cassette is coupled to the member during manual insertion of the cassette into an insertion position defined by two coupling stops on the member, the pin of the pin-slot linkage, which pin is arranged on the member, acts on the frontmost longitudinal wall of the slot in the drive lever viewed in the direction of insertion. Thus the forces occurring during coupling of the cassette to the member are transmitted from the member to the drive lever through the pin-slot linkage, and from the lever to the drive mechanism. These forces on the drive mechanism may be comparatively large. During normal operation after a cassette is inserted manually up to the insertion position defined by the two coupling stops, and detection of the presence of a cassette in the cassette receptacle, the motor is started automatically. The member is then moved inside the cassette receptacle by the motor driven insertion of the cassette via the drive mechanism, the drive lever and the pin-slot linkage. However, if the user of the apparatus has omitted to switch on the apparatus before the manual insertion of a cassette into the cassette receptacle, the motor is not started automatically after manual insertion of the cassette. In this case the user generally attempts to start the desired motor-driven insertion of the cassette into the cassette holder by exerting more and more pressure on the cassette. The manual pressure on the cassette then results in comparatively large forces being exerted on the drive mechanism via the two coupling stops on the member, the member and the drive lever, which is coupled to the member via the pin-slot linkage. The drive mechanism may be dimensioned to withstand such forces, but this demands a comparatively large space and is expensive. It is desirable to minimize the dimensions of the drive mechanism but this increases the likelihood of parts of the mechanism being deformed and damaged.

SUMMARY OF THE INVENTION

It is the object of the invention to mitigate the above-mentioned problems, and to construct a motor-driven cassette insertion mechanism in such a way that when a cassette is coupled to the member during manual insertion of this cassette into the cassette receptacle, the drive mechanism is protected against excessive forces even if the user has forgotten to switch on the apparatus.

In an apparatus embodying the invention, the longitudinal wall of the slot, opposite the longitudinal wall which cooperates with the pin when the drive lever is driven by the motor to move the member from its initial position, into its operating position has a recess which extends substantially in the direction of insertion. The recess and the pin are situated opposite one another in the direction of insertion, when the member is in its initial position. The pin engages the recess when a cassette is coupled to the member during manual insertion of the cassette into its insertion position and the pin is clamped against a wall portion of said recess to form a detachable clamped connection for blocking pivotal movement of the drive lever. In this way, the drive lever cannot be pivoted because the pin and the wall of the recess in the slot are automatically clamped against one another when a cassette is coupled to retaining member during manual insertion of a cassette into the cassette receptacle.

In accordance with the invention, the forces as a result of the manual load exerted on the cassette which are transmitted to the drive lever via the coupling stop on the member, the member and the pin-slot linkage, are taken up by the drive lever which is blocked against pivotal movement, so that no forces are transmitted to the drive mechanism. In this way the drive mechanism is protected against overloads in a particularly simple and reliable manner, even if the user has forgotten to switch on the apparatus. As a result of this overload protection for the drive mechanism this mechanism can be constructed with comparatively small dimensions, so that it is compact and cheap to build.

The wall portion of the recess against which the pin is clamped may have the shape of a circular arc which is substantially coaxial with the pivotal axis of the drive lever, the pin being clamped against this wall portion by the friction between the pin and the wall portion. The clamped connection can then be released simply by driving the drive lever with the motor via the drive mechanism, but in this case at least the friction between the pin and the wall portion has to be overcome. In practice, a force component produced by the manual pressure on the cassette may occur in addition to this frictional force, in which case a larger force is necessary to release the clamped connection. This again results in the motor and the drive mechanism being loaded to a comparatively large extent.

Preferably, at least when a cassette is coupled to the member during manual insertion of the cassette up to its insertion position, a spring mechanism acts on the member in a direction substantially opposite to the direction of insertion. After the release of a cassette which has been inserted manually up to its insertion position, and has been coupled to the member, the spring mechanism moves the member back in a direction opposite to direction of insertion to release the clamped connection between the pin and the wall of the recess, and causes the pin be lifted off the wall portion of the recess. In this way, after the release of a cassette which has been inserted manually up to its insertion position, the clamping connection is released automatically without the drive mechanism and the motor being loaded by the force exerted by the spring means. The return movement of the member in a direction opposite to the direction of insertion after the release of a cassette is limited, in that the pin butts against that longitudinal wall of the slot which is situated opposite the longitudinal wall with the recess. Thus the pin butts against the wall with which it will cooperate when the drive lever is driven by the motor to move the support from its initial position to its operating position. Further, the clamped connection between the pin and the wall portion of the recess is sustained through the shape of the pin and recess, and is therefore very reliable. This construction ensures that the clamped connection is released as a result of return movement of the member after the release of a cassette which has been inserted manually up to its insertion position. Moreover, this has the advantage that the manual insertion of the cassette and the motor-driven insertion of a cassette after the release of the clamped connection are two easy-to-distinguish operations as a result of the intervening release of the cassette, so that after manual insertion the cassette is not directly drawn out of the hand of the user, which would be annoying.

The spring means may be constituted by the drive mechanism which is coupled to the member via the drive lever and the pin-slot linkage, use being made of the elasticity of at least one part of the drive mechanism which, in order to obtain the spring action which is necessary at least during the coupling of a cassette to the member, is tensioned by the member via the pin-slot linkage and the drive lever before the clamped connection is established when a cassette is coupled to the member. However the spring action thus obtained is comparatively weak and depends strongly on tolerances. Alternatively, the spring means may be constituted by a spring which acts on the movable member and on a stationary part of the cassette receptacle, but such a spring not only acts on the member when this member is coupled to a cassette but it acts permanently on this member in a direction opposite to the direction of insertion, so that during the motor-driven insertion of a cassette this spring force must be overcome by the motor.

Thus, in the preferred embodiment the pin-slot linkage is arranged to connect between the drive lever and an intermediate part which is mounted on the member to be movable substantially in the direction of insertion. A spring acts between the intermediate part and the member, and urges the intermediate part in the direction of insertion and, when the member is in its initial position, keeps this part against a first limiting stop. When a cassette is coupled to the member during manual insertion of the cassette up to its insertion position and the pin-slot linkage has reached the position in which it is clamped, further movement of the cassette and retaining member lifts the first limiting stop off the intermediate part against the spring force. A portion intermediate part is retained via the clamped connection. Next a second limiting stop on the member abuts against the intermediate part and, after the release of the cassette which has been inserted up to its insertion position, the spring moves the member in a direction opposite the insertion direction, until the first limiting stop abuts the intermediate part. In this way, it is achieved that during coupling of the cassette to the member the spring is tensioned additionally between the member and the intermediate part which is retained via the clamped connection; and the member moves the intermediate part in a direction opposite to the direction of insertion as a result of the cycle of movements. After the first limiting stop again abuts against the intermediate part, the pin may be lifted off the wall portion of the recess and, if necessary, leave the recess, so that the clamped connection is released. Since the spring by means of which the clamped connection is released acts between the member and the intermediate part mounted on the member, the spring has the advantage that it does not additionally load the drive mechanism and the motor during motor-assisted insertion of the cassette.

In an apparatus in which, after the release of a cassette which has been inserted up to its insertion position, the clamped connection is released by moving back the member under the influence of a spring means, the cassette receptacle carries may carry a switching device which is connected to a control circuit for switching on the motor and which can be actuated by a cassette inserted into the receptacle, to supply a switching signal when the cassette has reached its insertion position. The motor may be started for the motor-driven insertion of a cassette by applying the switching signal to the control circuit via a delay circuit whose delay is at least so long as to allow the clamped connection to be released within the delay period during normal operation. However, if in the event of incorrect operation the user of such an apparatus releases the cassette, which has been inserted up to its insertion position, too late or not at all, the control circuit will switch on the motor after the delay has expired although the clamped connection is not released. Such operation may lead to overloading and damaging of the motor and the drive mechanism.

Preferably, after the release of a cassette which has been inserted up to its insertion position and after the return movement of the member under the influence of the spring means, the switching device terminates the supply of switching signals and the control circuit, which is connected to the switching device, detects the end of the switching signals and subsequently starts the motor. This ensures that the motor is switched on and, consequently, the cassette is inserted by means of the motor, only after the cassette, which has been inserted manually up to its insertion position, has been released and the clamped connection has been released. In this way the motor and the drive.

Embodiments of the invention will be described in more detail, by way of example, with reference to the accompanying drawings.

DESCRIPTION OF THE PREFERRED EMBODIMENTS

Figure 1:
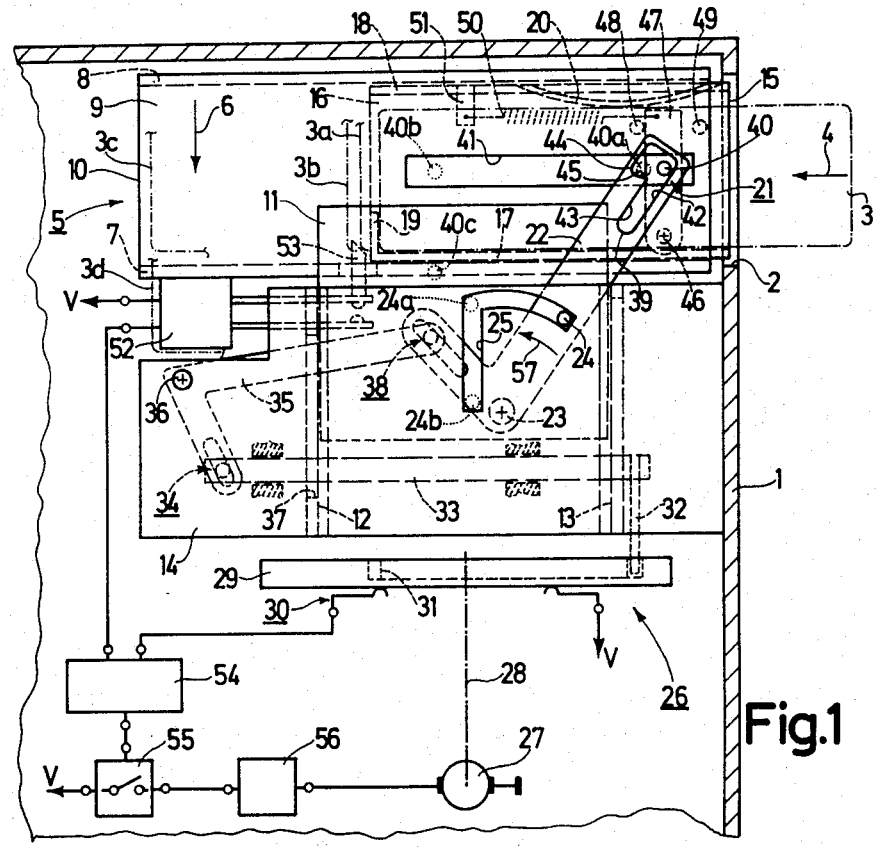
FIG. 1 is a schematic side view showing the relevant parts of an apparatus having a slot formed in the drive lever and a pin connected to the member, with the member in the initial position.

The recording and/or reproducing apparatus shown in FIG. 1 comprises an apparatus housing 1 which has a front opening 2 through which a cassette 3, represented schematically by dashed-dot lines in FIG. 1 and containing for example a record carrier in the form of a tape such as a magnetic tape, can be inserted manually in an insertion direction indicated by the arrow 4. It is obvious that such a cassette 3 may alternatively contain a disc-shaped record carrier such as a magnetic disc.

The apparatus comprises a cassette receptacle 5, for receiving a cassette 3. The receptacle 5 can be lowered from a loading position, in which a cassette 3 can be inserted into the receptacle in the direction of insertion 4, into an operating position, not shown, in a direction perpendicular to the major surfaces of an inserted cassette, as indicated by an arrow 6, and can be moved upwards in the opposite direction. In the operating position of the cassette receptacle 5, a cassette in this receptacle cooperates with drive means of the apparatus for driving the record carrier and scanning means of the apparatus for scanning the record carrier in order to record and/or reproduce information signals.

In principle, the cassette receptacle 5 is constituted by a holder 10 comprising a bottom wall 7, an upper wall 8 and two side walls 9, forming a channel. Only one side wall 9 is visible in the side view of FIG. 1. The side walls 9 are each connected to a guide plate 11. Each guide plate 11 is guided between two guides 12 and 13 for movement in the direction indicated by the arrow 6. The guides 12 and 13 are each mounted on a respective chassis plate 14 which is rigidly connected to the apparatus housing 1, and extend into the space between the two chassis plates 14, so that the cassette receptacle 5 is supported between the chassis plates 14 so as to be movable between its loading position and its operating position.

For retaining a cassette 3 in the cassette receptacle 5 this receptacle comprises two retaining members 15, of which only one member is shown in FIG. 1. The two members 15 are members of substantially U-shaped cross-section, which are guided inside the holder 10 in a manner not shown so as to be slidable in the direction of insertion 4. Each member 15 has a side wall 16, which is spaced from and extends adjacent the side wall 7 of the holder 10, a bottom wall 17, which slides over the bottom wall 7 of the holder 10, and an upper wall 18 which slides under the upper wall 8 of the holder 10, the bottom walls 17 and upper walls 18 of the two members 15 being aligned relative to one another. The two members 15 are movable in the direction of insertion 4 from an initial position shown in FIG. 1 into an operating position, not shown. In the initial position of the two members 15 a cassette 3 which is inserted manually can be coupled to the two members. Manual insertion is possible up to an insertion position of the cassette, which position is defined in part by a coupling stop 19 which projects upward from the bottom wall 17 towards the upper wall 18, as will be described in more detail hereinafter.

Two blade springs 20 act on a cassette 3 which is coupled to the two members 15, each of the springs being secured to an upper wall 18 of a respective member 15 and urging a cassette which is coupled to this member onto the bottom wall 17 of the member. By moving the two members 15 in the direction of insertion 4 into their operating position, as will be described hereinafter, a cassette 3, which has been inserted manually up to the coupling stops 19 and which is coupled to the two members, is inserted completely into the holder 10 of the cassette receptacle 5.

For moving the two members 15 and the cassette 3 coupled thereto, each of the two members is connected to a pivotal drive lever 22 via a pin-slot linkage 21, of which only one linkage is shown in FIG. 1. The two drive levers 22 are each arranged between a respective chassis plate 14 and guide plate 11, and are each pivotable about a pivot on that guide plate 11. The drive levers 22 each carry a guide pin 24, which projects into a guide slot 25 in the chassis plate 14. The guide slots 25 have a loading portion which is an arc of a circle coaxial with the axis of the pivot 23 of the drive lever 22, and a lowering portion which extends parallel to the direction of movement 6 of the cassette receptacle 5. The initial positions of the members 15 are defined by means of the drive levers 22 and the pin-slot linkages 21, because the guide pins 24 abut against the end walls of the arcuate loading portions of the guide slots 25.

The two drive levers 22 can be driven by a motor 27 through a drive mechanism 26. The drive mechanism 26 comprises a transmission 28, shown schematically, which can be driven by the motor 27 to drive a cam disc 29. Depending on the specific requirements imposed on the power to be transmitted, the speed to be transmitted etc., the transmission 28 may comprise a gear-wheel mechanism, a worm gear or the motor shaft itself. The cam disc 29 cooperates with a rotary switch 30, shown schematically, which in known manner detects the angular position of the disc 29, to enable this disc to be stopped in predetermined angular positions. On one flat end surface the disc 29 has a continuous cam groove 31 which is engaged by a cam follower in the form of a pin 32 which projects from one end of an actuating slide 33. The other end of the actuating slide 33 is coupled to a bellcrank lever 35 via a pin-slot linkage 34. The bellcrank lever 35 is fixedly secured to a shaft 36 which is journalled between the two chassis plates. The shaft 36 also carries a second substantially identical bellcrank lever (not shown), which is not coupled to the actuating slide 33. Thus, the two levers 35 are coupled to each other by the spindle 36 to but is fixed to the shaft 36 to ensure a synchronous pivotal movement. On the ends of their longer arms which extend through openings 37 in the guides 12 the two bellcrank levers 35 each carry a pin of a further pin-slot linkage 38 by which the bellcrank levers 35 are coupled to the drive levers 22. Thus, the mechanism 26 for driving the two drive levers 22 comprises the transmission 28, the cam disc 29, the actuating slide 33 and the two bellcrank levers 35, which are rigidly secured to the shaft 36.

In the present case the pin-slot linkages 21 each comprise a slot 39 formed in a drive lever 22 and a pin 40 connected indirectly, as will be described below, to the members 15. The two pins 40 extend through openings 41 in the side walls 9 of the holder 10 to enable them to cooperate with the slots 39. When the members 15 are in their initial positions the slots 39 extend obliquely relative to the direction of insertion 4. When the drive levers 22 are driven by the motor 27 via the drive mechanism 26 in order to move the members 15 from their initial positions shown in FIG. 1 to their operating positions, not shown, the rearmost (viewed in the direction of insertion 4) longitudinal walls 42 of the slots 39 of the linkages 21 cooperate with the pins 40 of these linkages.

The frontmost longitudinal walls 43 (viewed in the direction of insertion 4) of the slots 39 are situated opposite the walls 42, and each have a recess 44 which extends substantially in the direction of insertion 4. As can be seen in FIG. 1, the recesses 44 and the pins 40 are situated opposite one another viewed in the direction of insertion 4 when the members 15 are in the initial positions. The recesses 44 each have a flat wall portion 45 which, when the members 15 are in their initial positions as shown in FIG. 1, extends at an angle of approximately 15° to the direction of insertion and which is situated directly opposite the relevant pin 40, viewed in the direction of insertion. When a cassette 3 is coupled to the members 15 during manual insertion of the cassette up to its initial position the pins 40, which are connected indirectly to the retaining members, enter the recesses 44 and are clamped against the wall portions 45 to form a detachable clamped connection for blocking a pivotal movement of the drive lever 22, as will be described hereinafter.

Each pin-hole linkage 21 is arranged to connect between a drive lever 22 and an intermediate lever 47. The intermediate lever is arranged between the wall 16 of the member and a side wall 9 of the holder 10, and is mounted for pivotal movements substantially in the direction of insertion 4 about a pivotal axis 46 on the member 15. The pivotal movement of each intermediate lever 47 is limited by a frst limiting stop 48 which is situated beyond the intermediate lever 47 viewed in the direction of insertion 4 and which projects from the wall 16 of the member 15, and a second limiting stop 49 which is situated behind the intermediate lever 47 viewed in the direction of insertion 4 and which projects from the wall 16 of the member 15. One end of a tension spring 50 is attached to each intermediate lever 47 and the other end of this spring is attached to a projection 51 on the upper wall 18 of each member 15.

When a cassette is coupled to the members during manual insertion of this cassette up to its insertion position, at the end of the coupling operation the tension springs 50 act on the members 15 in a direction opposite to the direction of insertion 4. After the release of a cassette 3 which has been inserted manually up to its insertion position and which is coupled to the members, the tension springs 50 move the members 15 in a direction opposite to the direction of insertion 4 to release the clamped connections between the pins 40 and the wall portions 45 of the recesses 44, allowing the pins 40 to be lifted off the wall portions 45 of the recesses 44 and to be disengaged from the recesses 44. The tension springs 50 urge the intermediate levers 47 in the direction of insertion 4 and when the members 15 are in their initial positions they keep the intermediate levers 47 positioned against the first limiting stops 48.

When a cassette 3 is coupled to the members during manual insertion of this cassette up to its insertion position the first limiting stops 48 are lifted off the intermediate levers 47 against the force of the tension springs when the pins 40, which are connected to the intermediate levers 47, clamp against the wall portions 45. As insertion continues to the end of the coupling operation, the center portions of the intermediate levers are retained by the clamped connections between the pins 40 and the wall portions 45 of the recesses 44, so that the tension springs 50 are tensioned further, and the second limiting stops 49 for limiting the movements of the members 15 in the direction of insertion 4 then abut against the intermediate levers 47.

After the release of a cassette 3 which has been inserted up to its insertion position the tension springs 50 cause the members 15 to be moved back by the tension springs 50 in a direction opposite to the direction of insertion 4, so that the first limiting stops 48 abut against the intermediate levers 47, as will be described hereinafter. Instead of the intermediate levers 47 it is possible to us intermediate slides which are guided on the members 15 for a sliding movement between the two limiting stops exactly in the direction of insertion.

The bottom wall 7 of the holder 10 of the cassette receptacle 5 carries a switching device 52 which can be actuated by a cassette 3 being inserted into the cassette receptacle, and which in the present case is formed by a microswitch connected to a power supply V. Obviously, the switching device may comprise a photoelectric light barrier. The microswitch 52 has a lever 53 which extends through the bottom wall 7 of the holder 10 into the insertion path of a cassette, by means of which lever the micro switch can be closed to supply a switching signal by switching on the power supply V. The lever 53 is arranged in such a way that the switching signal is not supplied until the cassette has reached its insertion position. The microswitch 52 is connected to a control circuit 54 for switching on the motor 27, to which circuit the rotary switch 30, which is also connected to the power supply V, is also connected. The control circuit 54 can control an electronic switch 55 to which it is connected, and when this switch is turned on it supplies the supply voltage V to an amplifier circuit 56 for energizing the motor 27, so that the motor 27 is started.

After the release of a cassette 3 which has been inserted up to its insertion position and after the return movement of the members 15 under the influence of the tension springs 50, so that the cassette wall has returned at least as far as position 3a and the pins 40 have become disengaged from the wall portions 45 of the recesses 44, the microswitch 52 interrupts the switching signal, because the cassette has moved clear of the levers 53 of the microswitch 52. The control circuit 54, which is connected to the microswitch 52, is constructed so that it detects the end of the switching signal and subsequently switches on the motor 27. It is found to be very simple and advantageous if the control circuit 54 is realized by means of a microprocessor which receives the switching signal on one of its signal inputs, and whose program is such that as long as the cassette receptacle is in its loading position it cyclically scans a signal input in known manner to ascertain at which instant the switching signal disappears. As soon as the microprocessor has detected the end of the switching signal it produces a control signal on one of its signal outputs to close the electronic switch 55, so that the motor 27 is switched on.

OPERATION

If the cassette receptacle 5 is in its loading position, and the members 15 are in their initial positions, as is shown in FIG. 1, and a cassette 3 is inserted into the apparatus through the opening 2 in the apparatus housing 1 in order to couple the cassette to the members 15, the cassette will be situated between the two members and will be laterally guided by the walls 16 of the member 15. As the cassette is inserted further the upper front edge of the cassette which extends transversely of the direction of insertion butts against the two blade springs 20 on the upper walls 18 of the member 15, so that the members 15 are moved slightly out of their initial positions in the direction of insertion 4. As a result, the pins 40 of the pin-slot linkages will then engage the recesses 44 in the slots 39 and directly butt against the wall portions 45 of these slots. In FIG. 1 this position of the pins 40 is represented in dotted lines and designated 40a; the corresponding positions of the intermediate levers 41 carrying the pins 40 and of the members are not shown for the sake of clarity. During manual insertion of the cassette the pins 40, which abut against the wall portions 45, exert forces on the drive levers 22 which tend to pivot the drive levers in the direction indicated by the arrow 57. Such a pivotal movement would require that the wall portions 45 should be capable of moving in a direction opposite to that indicated by the arrow 6 at least partly transversely of the direction of insertion, but this transverse movement is prevented by the pins 40 which bear against the wall portion 45, because they can only be moved in the direction of insertion 4 and not transversely thereof. In this way realiable clamped connections are formed between the pins 40 and the wall portions 45 of the recesses 44, thus simply ensuring that the drive levers 22 cannot be pivoted when a cassette is manually inserted in order to be coupled to the members.

As the cassette is inserted further to couple it to the members 15, the members remain in positions which differs slightly from their initial positions and which are defined by the cooperation between the pins 40 and the wall portions 45, corresponding to the positions of the pins 40 indicated by the reference numerals 40a. As it is inserted further and has slid underneath the two blade springs 20, the cassette front wall (viewed in the direction of insertion) butts against the coupling stops 19 on the members 15, so that the cassette then occupies the position designated 3a in FIG. 1. Until this instant of the insertion process the intermediate levers 47 are positioned against the first limiting stops 48 under the influence of the tension springs 50. As the cassette is inserted still further it moves the two members 15 in the direction of insertion by movement of the coupling stops 19. The further movement of the member 15 causes the first limiting stops 48 to be lifted off the intermediate levers 47, which pivot about their portions where the pins 40 are connected because the clamped connections between the pins 40 and the wall portions 45, against the force of the tension spring 50. The springs 50 continue to be tensioned further, until the second limiting stops 49 butt against the intermediate levers 47 and limit the insertion path of the cassette. The cassette, which is positioned against the coupling abutments 19, assumes the position designated 3b in FIG. 1, which is the insertion position of the cassette corresponding to the maximum insertion depth of the cassette after manual insertion. During the movement of the cassette from its position 3a to its insertion position 3b, the cassette lower front edge engages with the lever 53 of the microswitch 52, so that the microswitch is closed and supplies a switching signal to the microprocessor 54, if the user has switched on the apparatus. This switching on may be effected by closing a power switch or plugging in a mains plug.

Now a further manual insertion of the cassette beyond its insertion position is no longer possible, because the cassette butts against the coupling abutment 19 situated on the members 15, and the members 15 cannot be moved any further in the direction of insertion as a result of the pins 40 which are clamped against the wall portions 45 and carried on the intermediate levers 47 against which the second limiting stops 49 abut. If the user of the apparatus now attempts to insert the cassette 3 further into the cassette receptacle 5 to start the motor-assisted insertion of the cassette by exerting more pressure, the manual force exerted on the cassette is transmitted to the blocked drive lever 22 via the coupling stops 19, the members 15, the intermediate levers 47, which abut against the second limiting stops 49, the pins 40, and the wall portions 45 of the recesses 44 of the slots 39. The force cannot be transmitted to the gear mechanism because the drive levers 22 are blocked, so that the drive mechanism is simply and reliably protected against overloading and damaging. This has the advantage that the drive mechanism dimensions can be comparatively small, resulting in a compact and cheap construction.

If the user of the apparatus now releases the cassette which has been inserted up to the insertion position 3b and which is coupled to the members 15, the tension springs 50, which have been tensioned further during the last stage of the cassette-insertion movement, pull the members 15 back in a direction opposite to the direction of insertion. During this withdrawal of the members 15 the first limiting stops 48 again abut against the intermediate levers 47 and, as a result of the dynamic movement process, the members together with the intermediate levers 47, which are again positioned against the first limiting steps 48, may be moved in a direction opposite to the direction of insertion 4 until the pins 40 engage with the rearmost longitudinal walls 42 of the slots 39 viewed in the direction of insertion, thus causing the pins 40 to be lifted off the wall portions 45 of the recesses 44 and to be moved out of the recesses. The clamped connections established between the pins 40 and the wall portions 45 of the recesses 44 during manual insertion are released. Since the tension springs 50 act between the members 15 and the intermediate levers 47, which again abut with the first limiting stops 48 on the members after the release of the cassette and after the return movement of the members, the tension springs do not additionally load the drive motor 27 during the subsequent motor-assisted insertion of a cassette into the cassette receptacle.

After the release of the cassette which has been inserted up to insertion position 3b and after the return movement of the members 15 under the influence of the tension springs 50, the cassette liberates the lever 43 of the microswitch 52, causing the microswitch to be opened and the switching signal to be terminated. The microprocessor 54 detects the end of the switching signal and subsequently supplies the control signal for closing the switch 55, so that the motor 27 is switched off. This ensures that the motor 27 is switched on after the release of a cassette and the release of the clamped connection between the pins 40 and the wall portions 45, which is then possible.

By means of the transmission 28 the motor 27 drives the cam disc 29, so that the actuating slide 33 is moved in the direction of insertion 4 via the groove 31 and the pin 32. As a result of this, one of the two bellcrank levers 35 is pivoted clockwise via the pin-slot linkage 34. The other bellcrank lever 35 is pivoted by the shaft 36, which results in a corresponding movement of the drive lever 22. During this movement of the drive lever 22 the guide pins 24 initially slide in the arcuate portions of the guide slots 25, causing the drive levers 22 to be pivoted counterclockwise as indicated by the arrow 57.

Via the rearmost longitudinal walls 42 of the slots 39, viewed in the direction of insertion, the pins 40, the intermediate levers 47, which abut against the first limiting stops 48, the members 15, and the cassette 3 coupled thereto are moved in the direction of insertion 4 until the members 15 occupy their operating positions, in which the cassette is in the position 3c in FIG. 1, the pins 40 are in position 40b, shown in dotted lines, and the guide pins 25 are in the positions 24a, shown in dotted lines. At the end of this pivotal movement of the drive levers 22 the guide pins 24 butt against the frontmost (in the direction of insertion 4) bounding walls of the portions of the guide slot 25 which extend in the direction of the arrow 6, so that a further pivotal movement of the drive lever 22 in the direction indicated by the arrow 57 is blocked and the members 15 are retained in their operating positions by the pivoted drive levers 22. From this instant the further pivotal movement of the bellcrank levers 35 is transmitted to the guide plates 11 of the cassette receptacle 5 via the pin-slot linkages 38 and the drive levers 22 and their pivots 23.

Because the drive levers are blocked for pivotal movement in the direction indicated by the arrow 57, the cassette receptacle 5 is lowered into its operating position in the direction indicated by the arrow 6, the members 15 being maintained in their operating positions by the drive levers 22. The operating position of the cassette receptacle 5 is reached when the guide pins 24 butt against the end walls of those portions of the guide slots 25 which extend in the direction indicated by the arrow 6, as is represented by the dotted lines in FIG. 1, the guide pins 24 being in position 24b. The pins 40 then occupy the positions 40c shown in dotted lines in FIG. 1 and the cassette 3 occupies the position 3d in FIG. 1. In order to bring the cassette receptacle into its operating position the cam disc 29 should be rotated half a turn out of the initial position shown in FIG. 1. After this rotation through half a turn the cam disc 29 supplies a position signal to the microprocessor 54 via the rotating switch means with which it cooperates. This signal is detected by the microprocessor, after which the microprocessor terminates the control signal for closing the switch 55, so that the motor 27 is switched off. Now the motor-assisted insertion of the cassette into the cassette receptacle and the movement of this receptacle into its operating position is completed.

In order to move the cassette receptacle 5 together with the cassette 3 out of its operating position, the microprocessor 54 can be controlled by a separate button, not shown, upon whose actuation the microprocessor 54 switches on the motor 27 for the duration of half a revolution of the cam disc 29. This causes the drive levers 22 to be moved by the motor 27 via the drive mechanism 26 in a sequence which is the reverse of the above, so that first the cassette receptacle 5 is raised and subsequently the members 15 are returned to their initial positions shown in FIG. 1, after which a cassette can be removed manually from the cassette receptacle and the apparatus.

Figure 2:
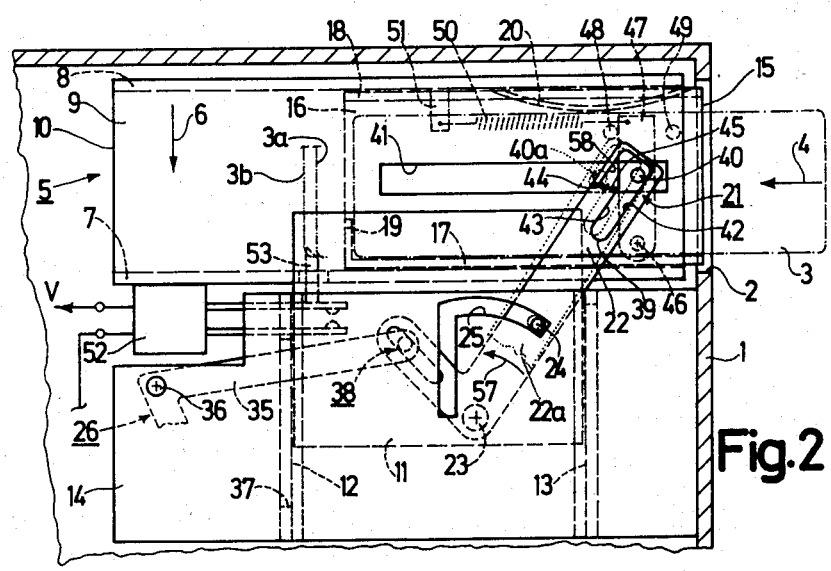
FIG. 2 is a schematic partial side view of a second embodiment, in which when a cassette is coupled to the two members each of the two pins first butts against another wall portion of the recesses and thereby causes the relevant drive lever to be moved before the clamped connection is formed.

In the apparatus shown in FIG. 2 the recesses 44 of the slots 39 of the pin-slot linkages 21 have been modified in comparison with those in the apparatus shown in FIG. 1, in such a way that during manual insertion of a cassette 3 up to its insertion position 3b in order to couple the cassette to the two members 15 each of the two pins 40 first butts against a frontmost wall portion 58 of a recess 44 viewed in the direction of insertion 4. The drive levers 22 are then moved and pivoted in the direction of the arrow 57 by the pins 40 via the wall portions 58. This pivotal movement continues until the wall portions 45, which are moved along, butt against the pins 40 and are coupled thereto an account of their shape, forming detachable clamped connections between the pins 40 and the wall portions 45, ensuring a reliable blocking of a pivotal movement of the drive levers 22. In FIG. 2 this situation is represented by the dotted lines, the pins 40 being in position 40a and the drive levers 22 being in position 22a. As in this embodiment, during insertion of a cassette, the pins 40 do not butt directly against the wall portions 45 to form the clamped connections (as was the case in the apparatus shown in FIG. 1), the relative positions of the wall portions 45, against which the pins 40 are clamped, are less critical with respect to the pins 40 when the members 15 are in their initial positions. In all other respects the construction and operation of the apparatus shown in FIG. 2 corresponds to that of the apparatus shown in FIG. 1, so that the present apparatus also has all the advantages of the apparatus shown in FIG. 1.

In the apparatus shown in FIG. 2, in which the drive levers 22 should first be pivoted slightly via the pins 40 before the clamped connections between the pins 40 and the wall portions 45 are established, this pivotal movement may be utilized for elastically tensioning at least one part of the drive mechanism 26, for example the longer arm of the bell-crank lever 35, the spring action obtained by the elasticity of this part being used for the return movement of the members 15 via the drive levers 22 after the release of a cassette which has been inserted up to its insertion position 3b. This enables the intermediate levers 47 and the tension springs 50 to be dispensed with and the pins 40 to be arranged simply on the transverse walls 16 of the members 15.

Figure 3:
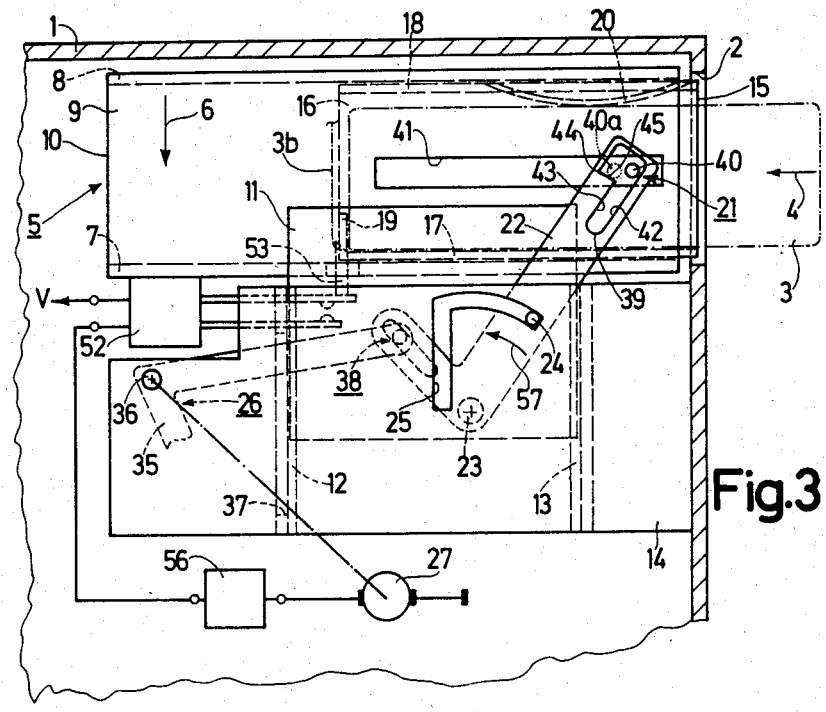
FIG. 3 is a similar view of a modification of the apparatuses shown in FIGS. 1 and 2, in which the clamped connection between a pin and a wall portion of the recess is established under the influence of a force.

In the apparatus shown in FIG. 3 the pins 40 of the pin-slot linkages 21 are arranged directly on the walls 16 of the members 15 and the wall portions 45 of the recesses 44 in the slots 39 against which the pins 40 are clamped have the shape of an arc of circle which is coaxial with the axis of the pivots 23 of the drive levers 22. These wall portions 45 are situated directly in the path of movement of the pins 40 which during insertion of a cassette are moved by the members 15 when these members are in their initial positions. The shape of the wall portions 45 is such that the clamped connections, formed between the wall portions and the pins 40 in position 40a during manual insertion of a cassette, are established under the influence of the friction between the pins and the wall portions.

Such connections can be released simply by driving the drive levers 22 by means of the motor 27 via the drive mechanism 26, because the arcuate wall portions 45 and the pins 40 then slide over one another, so that only the friction between them has to be overcome. For this reason the lever 53 of the microswitch 52 in the present apparatus is arranged on the cassette receptacle 5 in such a way that a manually inserted cassette 3 actuates the lever when the insertion position 3b is reached, so that the microswitch 52 is closed and supplies a switching signal, which is applied directly to the amplifier circuit 56 in order to switch on the motor 27. When a cassette 3 reaches its insertion position 3b, the motor 27 is thus switched on, after which the motor, via the drive mechanism 26, of which a part is shown only schematically in dash-dot lines, moves the drive levers 22 to obtain the motor-assisted insertion of a cassette into the cassette receptacle and to lower the cassette receptacle into its operating position. When the cassette receptacle 5 has reached its operating position this receptacle actuates, for example, a switch not shown, to supply a signal for stopping the motor 27.

If the user of the apparatus shown in FIG. 3 has forgotten to switch on the apparatus, the microswitch 52 will not supply a switching signal when the insertion position 3b of the cassette is reached, so that the motor 27 is not started for the motor-assisted insertion of the cassette into the cassette receptacle. If the user then intends to start this operation by exerting more pressure on the cassette, the resulting comparatively large forces are taken up, in the same way as in the apparatuses described above, by the drive levers 22 which are blocked against pivotal movements via the detachable clamped connections between the pins 40 and the wall portions 45, so that in the present apparatus the drive mechanism is also simply and reliably protected against overloading.

Figure 4:
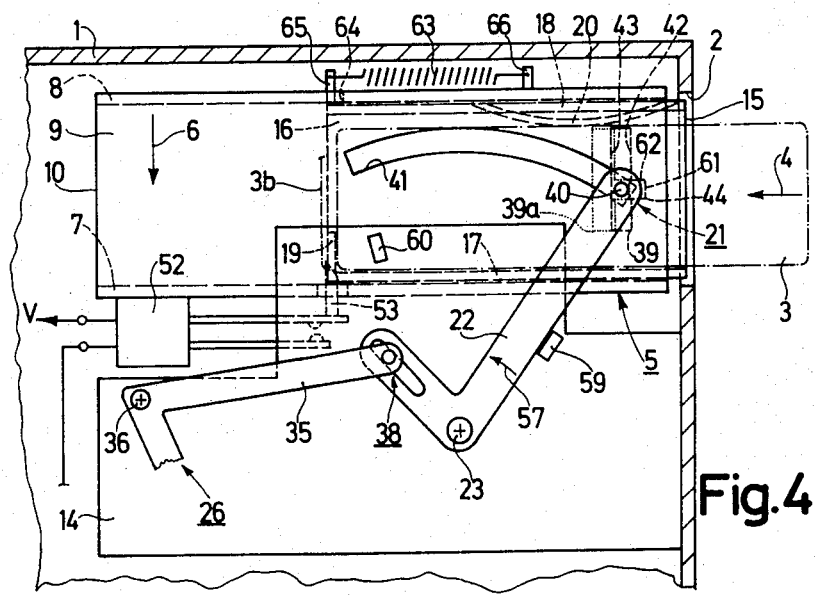
FIG. 4, like FIGS. 1 to 3, is a view of an apparatus in which each pin-slot linkage comprises a slot formed in the member and a pin connected to the drive lever and the clamped connection is established by giving the pin and wall portion a suitable shape.

In the fourth embodiment shown in FIG. 4, the cassette receptacle 5 is supported directly by the chassis plates 14 and is therefore immovably arranged inside the apparatus. Again the drive levers 22 are mounted directly on the chassis plates 14 for pivotal movement between two limiting stops 59 and 60. When the drive levers 22 abut against the limiting stops 59 the members 15 are in their initial positions. When the drive levers 22 are driven by the motor a cassette coupled to the members 50 is drawn into the stationary cassette receptacle. As soon as the drive levers 22 abut against the limiting stops 60 the members 15 have reached their operating positions, after which the motor which drives the drive levers is switched off. Subsequently, drive means and scanning means of the apparatus, for driving the scanning the record carrier in the cassette, can be moved upwards towards the cassette, as indicated by the arrow 6, to cooperate with the record carrier.

In this fourth embodiment the slots 39 of the pin-slot linkages 21 are formed in the walls 16 of the members 15, the walls 42 and 43 of the slots 39 extending transversely of the direction of insertion 4. The pins 40 of the pin-slot linkages 21 are mounted on the drive levers 22 and, in the present example, they extend through openings 41 in the side walls 9 of the cassette receptacle 5. The openings 41 have the shape of an arc of circle which is coaxial with the pivots 23 of the drive levers 22, to cooperate with the slots 39. When the drive levers 22 are driven by the motor to move the members 15 from their initial positions to their operating positions, the pins 40 in this embodiment cooperate with the frontmost longitudinal walls 43 of the slots 39, viewed in the direction of insertion. The opposite longitudinal walls 42, which are situated at the rear viewed in the direction of insertion, are formed with recesses 44 which extend in the direction of insertion and which are situated opposite the pins 40 when the members 15 are in their initial positions.

During manual insertion of a cassette the members 15 in the present apparatus are moved along, causing the pins 40 to engage in the recesses 44 in the slots 39, which are now in position 39a. The pins 40 then butt against the rearmost wall portions 61 (viewed in the direction of insertion) of the recesses 44, so that via the pins 40 the drive levers 22 are pivoted slightly in the direction indicated by the arrow 57 until the pins 40 butt against the wall portions 62 which extend in the direction of insertion 4, to form a detachable clamped connection.

These clamped connections ensure that the drive levers 22 are blocked for pivotal movements during manual insertion of a cassette, so that the drive mechanism is reliably protected against overloading.

In order to release the clamped connections between the pins 40 and the wall portions 62 established during manual insertion of a cassette, the present apparatus comprises two tension springs 63 which are each attached to a projection 65, which is situated on an upper wall 18 of a member 15 and which extends through an opening 64 in the upper wall 8 of the cassette receptacle 5, and a projection 66 on the upper wall 8 of the cassette receptacle 5. After the release of a cassette which has been inserted manually up to its insertion position 3b the tension springs 63 pull the members 15 to which the cassette is coupled back in a direction opposite to the direction of insertion 4, causing the pins 40 to become disengaged from the recesses 44 and the clamped connections between the pins 44 and the wall portions 62 to be released. The microswitch 52 is not opened and the switching signal supplied by the microswitch is not terminated until after the release of the cassette and after the return movement of the members 15, after which the microprocessor, not shown, switches on the motor 27, in the same way as in the apparatus shown in FIG. 1, for the motor-assisted insertion of a cassette.

Obviously, the invention is not limited to the embodiments described in the foregoing, but various modifications are possible within the scope of the invention. For example, instead of being shaped to define an insertion path, the cassette receptacle may comprise two stationary chassis plates between which a single channel-shaped holder for a cassette is movable. The holder may be driven by means of only one drive lever, the pin-slot linkage between the holder and the drive lever being arranged, for example, near the bottom wall of the holder and comprising a pin which projects perpendicularly from the bottom wall and a slot formed in a drive lever which is pivotally mounted parallel to the bottom wall. Alternatively, a channel-shaped holder may be arranged so as to be movable between two stationary chassis plates in which substantially L-shaped guides are formed to guide the support consecutively in the direction of insertion and perpendicularly thereto, which chassis plates may each carry a drive lever which is coupled to a side wall of the holder via a pin-slot linkage.

What is claimed is:

1. A recording and/or reproducing apparatus for a record carrier accommodated in a cassette, comprising:
   a cassette receptacle into which a cassette can be inserted manually in a direction of insertion, said receptacle comprising at least one cassette-retaining member having a coupling stop, said member being movable from an initial position into an operating position at least partly in the direction of insertion,
   a pivotable drive lever,
   a drive mechanism including a motor for driving said drive lever pivotably, and
   a pin-slot linkage for moving said member with the cassette in response to pivoting of the drive lever, said linkage including a pin and a slot having two longitudinal walls, said pin extending through said slot for cooperation with one of said walls when the drive lever is driven by the motor to move the member from its initial position to its operating position; said member, when substantially in its initial position, being arranged to be coupled to a cassette which is inserted manually up to an insertion position defined by said coupling stop, characterized in that the other longitudinal wall, opposite said one wall, has a recess which extends substantially in the direction of insertion; when the member is in said initial position, said recess and said pin being disposed opposite one another in the direction of insertion, and said pin engaging said recess when a cassette is coupled to the member during manual insertion of the cassette to its insertion position, said pin being clamped against a wall portion of said recess to form a detachable clamped connection for blocking a pivotal movement of the drive lever.

2. An apparatus as claimed in claim 1, characterized by comprising spring means which, at lest when a cassette is coupled to the member during manual insertion of the cassette up to its insertion position, acts on the member in a direction substantially opposite to the direction of insertion; and which after the release of a cassette which has been inserted manually up to its insertion position and which is coupled to the member, moves the member back in a direction opposite to direction of insertion to release the clamped connection between the pin and the wall of the recess, causing the pin be lifted off the wall portion of the recess.

3. An apparatus as claimed in claim 2, in which the cassette receptacle carriers a switching device which is connected to a control circuit for switching on the motor and which can be actuated by a cassette inserted into said receptacle, to supply a switching signal when the cassette has reached its insertion position, characterized in that after the release of a cassette which has been inserted up to its insertion position and after the return movement of the member under the influence of the spring means, the switching device terminates the supply of switching signals and the control circuit, which is connected to the switching device, detects the end of the switching signal and subsequently starts the motor.

4. A apparatus as claimed in claim 2, characterized in that the pin-slot linkage connects between the drive lever and an intermediate part which is mounted on the member to be movable substantially in the direction of insertion and which cooperates with said spring means, said spring means acting between said part and the member to urge the intermediate part in the direction of insertion and, when the member is in its initial position, to keep said part against a first limiting stop on the member; when a cassette is coupled to the member during manual insertion of said cassette up to its insertion position, the first limiting stop being lifted off the intermediate part against the spring force, the intermediate part being retained via the clamped connection, and a second limiting stop on the member abutting against the intermediate part; and, after the release of the cassette which has been inserted up to its insertion position, the spring again urging the first limiting stop against the intermediate part.

5. An apparatus as claimed in claim 4, in which the cassette receptacle carries a switching device which is connected to a control circuit for switching on the motor and which can be actuated by a cassette inserted into said receptacle, to supply a switching signal when the cassette has reached its insertion position, characterized in that after the release of a cassette which has been inserted up to its insertion position and after the return movement of the member under the influence of the spring means, the switching device terminates the supply of switching signals and the control circuit, which is connected to the switching device, detects the end of the switching signal and subsequently starts the motor.

* * * * *

UNITED STATES PATENT AND TRADEMARK OFFICE
CERTIFICATE OF CORRECTION

PATENT NO. : 4,654,731

DATED : March 31, 1987

INVENTOR(S) : Kurt Froschl et al

It is certified that error appears in the above-identified patent and that said Letters Patent is hereby corrected as shown below:

<u>IN THE CLAIMS</u>

Claim 2, line 12 (Column 15, line 27) before "be" insert --to--

Claim 3, line 2 (Column 15, line 29) change "carriers" to --carries--

Signed and Sealed this

Seventeenth Day of May, 1988

*Attest:*

DONALD J. QUIGG

*Attesting Officer*     *Commissioner of Patents and Trademarks*